(12) United States Patent
Hojjatie et al.

(10) Patent No.: US 7,897,133 B1
(45) Date of Patent: Mar. 1, 2011

(54) PROCESS FOR CONVERSION OF WASTE FLUID STREAMS FROM CHEMICAL PROCESSING PLANTS TO BENEFICIARY AGRICULTURE PRODUCTS

(75) Inventors: Michael Massoud Hojjatie, Tucson, AZ (US); Anatoly Pustilnik, Tucson, AZ (US); Harry Charles Kominski, Phoenix, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 12/563,034

(22) Filed: Sep. 18, 2009

(51) Int. Cl.
*C01B 17/96* (2006.01)
*C01C 1/24* (2006.01)
(52) U.S. Cl. .................. 423/545; 423/549; 423/550
(58) Field of Classification Search .............. 423/545, 423/549, 550
See application file for complete search history.

(56) References Cited

U.S. PATENT DOCUMENTS

| | | | |
|---|---|---|---|
| 1,315,639 A * | 9/1919 | Piette ........................ | 423/550 |
| 3,180,713 A * | 4/1965 | Flay ........................... | 423/545 |
| 3,711,597 A * | 1/1973 | Scarfi et al. ................ | 423/545 |
| 4,032,618 A | 6/1977 | Matthews | |
| 5,286,389 A | 2/1994 | Hardison | |
| 5,431,877 A | 7/1995 | Brucken et al. | |
| 5,470,486 A | 11/1995 | Gillespie | |
| 5,672,326 A | 9/1997 | Minak et al. | |
| 6,602,443 B2 | 8/2003 | Burns et al. | |
| 6,902,713 B1 | 6/2005 | Binoist et al. | |
| 7,258,848 B1 | 8/2007 | Blackwell et al. | |

FOREIGN PATENT DOCUMENTS

| | | |
|---|---|---|
| EP | 0 857 509 | 8/1998 |
| EP | 1 493 713 | 1/2005 |
| JP | 52-026502 A * | 2/1977 |

* cited by examiner

*Primary Examiner*—Timothy C Vanoy
(74) *Attorney, Agent, or Firm*—Fennemore Craig, P.C.; Susan Stone Rosenfield

(57) ABSTRACT

The present invention is directed to the conversion of gas streams comprising ammonia, hydrogen sulfide, and water in the form of liquids or gases that are generated by petroleum refineries and coke ovens to beneficiary agriculture products, by forming ammonium sulfide and then converting the ammonium sulfide, using sulfuric acid, to pure ammonium sulfate.

18 Claims, 2 Drawing Sheets

US 7,897,133 B1

PROCESS FOR CONVERSION OF WASTE FLUID STREAMS FROM CHEMICAL PROCESSING PLANTS TO BENEFICIARY AGRICULTURE PRODUCTS

FIELD OF INVENTION

The present invention is directed to the conversion of gas streams comprising ammonia, hydrogen sulfide, and water in the form of liquids or gases that are generated by petroleum refineries and coke ovens to beneficiary agriculture products, particularly ammonium sulfate (AST) solution or dry ammonium sulfate product using spent alkylation sulfuric acid or virgin sulfuric acid.

DESCRIPTION OF RELATED ART

Hydrogen sulfide is highly toxic to humans and at concentrations over 1,000,000 µg/m$^3$ (about 1000 ppm) quickly causes death by paralysis of the respiratory system. At lower concentrations, it causes conjunctivitis with reddening and lachrymal secretion, respiratory tract irritation, nerve effects, pulmonary edema, heart muscle damage, locomotion, and unconsciousness.

Atmospheric concentrations of ammonia are usually below the level to be harmful to human, animals and plants. High concentrations of ammonia are detrimental to humans, and animals due to its corrosivity causing damage to mucous membranes, eyes, throat and upper respiratory tract. It is known to produce injury to plant leaves and stem tissue and reduces or delays plant seeds germination.

Industrial chemical processing plants including petroleum refineries produce spent acid waste. Alkylation units react olefins with an iso-paraffin in the presence of an acid catalyst (such as HF or $H_2SO_4$). A large amount of spent sulfuric acid is formed during this alkylation reaction. This generally consists of 50-85% acid and a number of chemical contaminants, usually aromatic hydrocarbons.

Chemical processing plants such as petroleum refineries and coke ovens produce fluid streams or gases containing hydrogen sulfide and ammonia. In petroleum refineries, ammonia and hydrogen sulfide are produced as the result of hydrogen processing to remove nitrogen and sulfur from crude oil and repeated wash processes with water to form sour water. This sour water will be then subjected to water vapor action to remove ammonia and hydrogen sulfide. The action by water steam produces a sour water stripper gas or SWSG. The SWSG usually contain about ⅓ ammonia, about ⅓ hydrogen sulfide, and about ⅓ water vapor on a volumetric or molar basis. The SWSG stream can also contain carbon dioxide and other refinery hydrocarbons.

Gases containing hydrogen sulfide or both hydrogen sulfide and carbon dioxide are generally known as "sour gases" or "acid gases" in the hydrocarbon processing industries.

Industries with coke ovens also produce waste streams containing hydrogen sulfide and ammonia as raw coke oven gas. In order to make this gas suitable for use as fuel gas for the coke oven battery, hydrogen sulfide and ammonia are required to be removed from the gas.

There have been numerous approaches for removal or treatment of ammonia and hydrogen sulfide from chemical processing plants.

An approach common in many refineries to treat sour water stripper gas is to send the gas to a Claus unit for sulfur recovery. In the Claus sulfur recovery unit (SRU), the ammonia is converted to water and nitrogen, and hydrogen sulfide is converted to sulfur and water. One drawback of this process is the destruction of ammonia, which has commercial value.

Another approach is to convert the ammonia to oxides of nitrogen in a conventional oven in the spent acid recovery plant. A drawback of this approach is formation of nitrogen oxides which should be eliminated as well and also the reduction in the efficiency of the spent acid recovery unit.

Acid gas produced in the petroleum refinery could also be treated in a Claus SRU or scrubbed with caustic soda to separate ammonia from hydrogen sulfide.

Raw coke oven gas should be treated to remove corrosive ammonia and to remove hydrogen sulfide to meet emission regulations. One way of removing ammonia is to use a sulfuric acid scrubber to form ammonium sulfate. Hydrogen sulfide is removed by absorption into potassium carbonate, ammonia, or monoethanolamine (MEA).

Removal of hydrogen sulfide is critical due to health, safety, corrosion, and environmental concerns as well as material recovery. Conversion of refinery hydrogen sulfide to sulfur is presently the primary source of elemental sulfur on the market.

Natural gas containing hydrogen sulfide is referred to as "sour gas". Hydrogen sulfide is removed from sour gas by absorption in an alkaline solution, usually alkanolamine solutions. The absorbed hydrogen sulfide gas is removed from the amine solution by heating and stripping. The resulting gas stream contains a high concentration of hydrogen sulfide and potentially carbon dioxide along with some hydrocarbon carryover. The hydrocarbons phase will be separated as much as possible and the hydrogen sulfide gas will be processed either into a Claus SRU to be converted into sulfur, or to be scrubbed with caustic soda to produce sodium hydrogen sulfide (NaHS).

Liquid streams from refineries or coal-coking operations contain hydrogen sulfide and ammonia and are referred to as "sour water", and are generated through a washing process with water. Sour water is stripped with steam to remove ammonia and hydrogen sulfide resulting in the formation of sour water stripper gas (SWSG). The sour water stripper gas could be processed in a Claus SRU to produce sulfur, where ammonia is converted into nitrogen and water. Alternatively, ammonia could be separated from hydrogen sulfide by additional steam stripping.

Coal-coking industries also generate ammonia and hydrogen sulfide from coke oven gases in which the gases are scrubbed with water to form sour water. The sour water is desorbed with steam. The damp vapor is burned to form nitrogen, water, and sulfur.

An alternative to Claus SRU is to utilize a quench tower scrubber to convert hydrogen sulfide and ammonia to ammonium sulfide solution. The ammonium sulfide solution (ASD) could be used as raw material to produced purified hydrogen sulfide and ammonia streams.

U.S. Pat. No. 7,258,848 describes a method for removal of ammonia and hydrogen sulfide in which ammonia is removed as an aqueous salt solution from an acid gas with a strong acid such as sulfuric acid as scrubbing agent to convert ammonia to an ammonium salt.

EP0857509 A1 describes a method for removal of ammonia and hydrogen sulfide from acid gas by treating the stream with sulfuric acid to separate ammonia from hydrogen sulfide by converting ammonia to ammonium salt. The residue hydrogen sulfide is removed from the product by charcoal treatment.

U.S. Pat. No. 6,902,713 describes a method for partially oxidizing, in a Claus furnace, at least one gas comprising hydrogen sulfide and ammonia with at least one gas rich in oxygen.

In U.S. Pat. No. 5,672,326 ammonia and 5 to 40 volume percent hydrogen sulfide containing vapor which arise in the vaporization of process water from hydrocarbon or crude oil fraction or in gas treatment in a coking plant was subjected in a cracking catalyst reactor to breakdown of ammonia to nitrogen and hydrogen.

U.S. Pat. No. 5,286,389 describes a method for treatment of sour water to remove dissolved hydrogen sulfide by means of an aqueous, non-chelated polyvalent metal such as ferrous or ferric iron salt solution in a continuous recirculating system having reaction and oxygenation zones.

U.S. Pat. No. 5,470,486 describes a method for conversion of an aqueous stream containing a water-soluble, inorganic sulfide compound where the stream is contacted with oxygen in a thermal, non-catalytic conversion zone to convert the inorganic sulfide compound to sulfate and thiosulfate. The aqueous effluent from the thermal, non-catalytic conversion zone is then contacted with oxygen and an oxidizing catalyst on a carbon support at catalytic oxidation conditions to provide a conversion of thiosulfate to sulfate.

U.S. Pat. No. 4,032,618 describes a method for removing ammonia from the sour water steam of a coal gasification process in which ammonia is stripped from the sour water and is heated to 400-1000° F. and gaseous ammonia is passed through a reactor containing an ammonia-free gas. The ammonia free gas then is treated in a Claus reactor to recover elemental sulfur.

In U.S. Pat. No. 5,431,877 a process for decreasing the corrosivity of sour water is described in which ammonium polysulfide is added to sour water which contains cyanide ions, ammonium ions, and sulfide ions. At least part of cyanide ions in sour water is converted to thiocyanate ions by the ammonium polysulfide.

Spent sulfuric acid from alkylation units is one of the largest volume wastes obtained in petroleum refining. Its quantity is more than 130,000 metric tons per year. There are quite a few ways to treat this waste. A considerable amount of it (up to 30%) is handled by dumping. It could be extracted with green oil or straw oil and concentrated by evaporation. Spent sulfuric acid could be discharged or recovered in a discharge source (JP2003/004355).

U.S. Pat. No. 6,602,443 describes a method for acid gas treatment utilizing a combination of alkyl ethers.

Tessenderlo Kerley Inc., headquartered in Phoenix Ariz. has used a method for many years to convert either sour water stripper gas or acid gas to ammonium sulfide solution. In this process the gas stream containing ammonia, hydrogen sulfide, water vapor, and hydrocarbon impurities is cooled in the processing unit where ammonia and hydrogen sulfide react to form ammonium sulfide solution up to 45% concentration.

A drawback of this process is that the ammonium sulfide solution is contaminated up to 5% with hydrocarbon impurities from the refining process.

BRIEF SUMMARY OF THE INVENTION

The present invention is directed to the preparation of a useful agriculture product, more specifically ammonium sulfate, utilizing sour water stripper gas streams and/or acid gas streams to form ammonium sulfide intermediate.

The said ammonium sulfide intermediate is acidified with sulfuric acid, whether virgin or spent alkylation acid, in the first reactor at ambient conditions, or alternatively with moderate cooling, and with agitation to form ammonium sulfate solution.

The process is designed to form concentrated ammonium sulfate solution up to about 40% in concentration.

The said ammonium sulfate solution may be contaminated with hydrocarbons from either the sour water stripper gas or the spent alkylation acid and requires further purification.

A byproduct of this process is rather pure hydrogen sulfide that could be sent to a Claus SRU to form elemental sulfur, use a caustic scrubber to form pure sodium hydrosulfide, or to be collected and stored as pure hydrogen sulfide gas.

The said impure ammonium sulfate product is then transferred to an air stripping unit where the hydrocarbon impurities are removed by air or nitrogen.

The hydrocarbon impurities exiting the stripping tower are captured in a diesel fuel scrubber which could be returned to the petroleum refinery.

Any color impurities from the trace organics in the ammonium sulfate solution are removed by charcoal treatment to form pure and colorless ammonium sulfate solution.

The said pure ammonium sulfate solution has concentration up to about 40%.

Furthermore this solution could be utilized as an agriculture product or dried and crystallized and utilized in solid form.

BRIEF SUMMARY OF DRAWINGS

The present invention will now be described in more detail with reference to preferred embodiments of the invention, given only by the way of illustrations in the accompanying drawing in which.

DETAILED DESCRIPTION OF THE INVENTION

Figure 1:
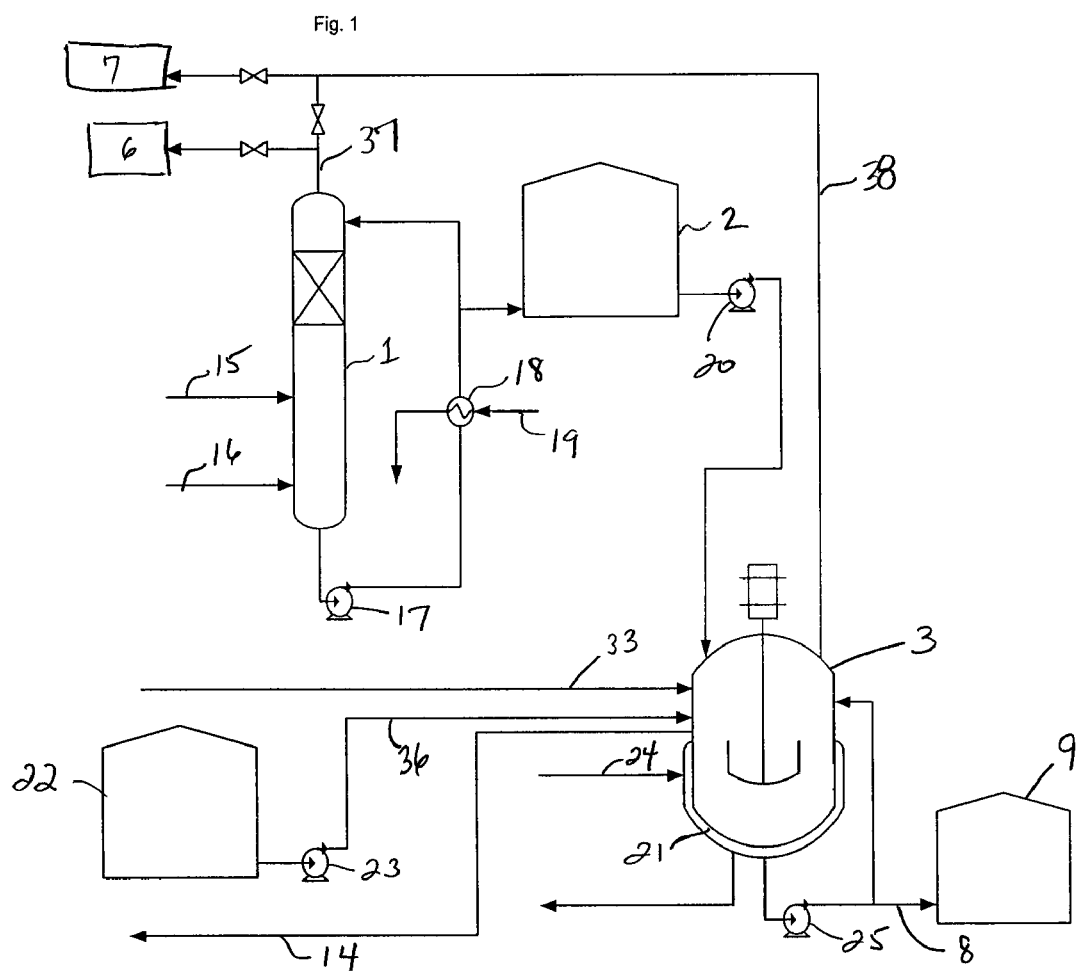
FIG. 1 is a graphical illustration for conversion of ammonium sulfide solution (ASD) formed from sour water stripper gas and acid gas, to crude ammonium sulfate (AST) product using spent alkylation sulfuric acid or virgin sulfuric acid.

The present invention comprises a process for the removal of petroleum refinery, coal-coking and natural gas processing sour gas streams in the form of liquid streams containing hydrogen sulfide and ammonia, by forming ammonium sulfide first and converting the ammonium sulfide, using spent alkylation or virgin sulfuric acid, to pure ammonium sulfate liquid or solid. The ammonium sulfate in liquid or solid form is useful as fertilizer.

Another aspect of this invention is to utilize spent alkylation sulfuric acid waste for the production of ammonium sulfate from ammonium sulfide.

The process of the present invention is described herein as proceeding according the following reaction pathways:

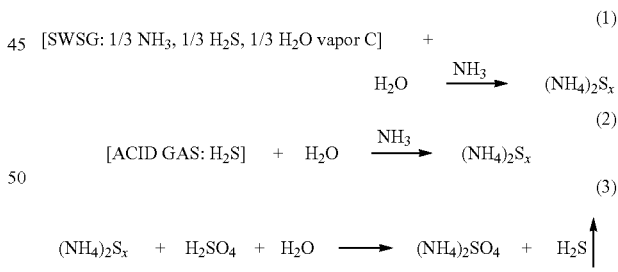

Reactions (1) and (2) involve conversion of sour water stripper gas (SWSG) or acid gas to ammonium sulfide solution using equipment that permits rapid, intimate contact of the gas and liquid reactants. For example, a static mixer, a vapor/liquid eductor, or apparatus to bubble the gas through a liquid reservoir of solution that is agitated. Preferably, an absorption column is used because it provides the most efficient way to disengage the vapor from the liquid while providing good gas and liquid contact. Reaction (3) involves the conversion of said ammonium sulfide product from the above reactions to ammonium sulfate using sulfuric acid.

Although reaction (3) illustrates a 1:1 mol ratio of ammonium sulfide (ASD) to sulfuric acid, an excess of sulfuric acid should be used. Sulfuric acid could be fresh (virgin grade) sulfuric acid or spent alkylation sulfuric acid.

Spent alkylation sulfuric acid contains 50-80% sulfuric acid along with various contaminations from the related process, usually hydrocarbons.

Ammonium sulfide solution generated from acid gas streams or sour water gas streams may contain up to 5% impurities, generally hydrocarbons from refining processes, natural gas, or coal-coking processes.

The hydrocarbon impurities are mostly removed during the conversion of ammonium sulfide to ammonium sulfate. The hydrocarbon impurities form as an organic layer and are decanted; however small quantities will be carried over which gives the ammonium sulfate product an organic hydrocarbon odor and brown color.

The refinery odor is removed preferably by nitrogen or air stripping and heat. Inert gases, or mixtures of air and inert gases, might also be used for air stripping. Activated carbon treatment might also be employed to remove odors.

The color of ammonium sulfate is removed by activated charcoal to produce a colorless solution of ammonium sulfate.

The process of reaction (3) is designed in such a way to produce 40% solution of ammonium sulfate. The assay of product is verified by the ion chromatographic method.

The practice of the present invention is described with reference to FIG. 1 (conversion of ammonium sulfide solution to crude ammonium sulfate) and FIG. 2 (conversion of crude ammonium sulfate to "pure" (about 40%) ammonium sulfate solution).

Conversion of sour water stripper gas and acid gas to ammonium sulfide is a known process and Tessenderlo Kerley, Inc, of Phoenix, Ariz. has practiced this process for many years. The sour water stripper gas and/or the acid gas containing ammonia, hydrogen sulfide, and water vapor is directed via line 15 into an absorption column 1 at a temperature which aids the absorption, i.e., at about 85-110° F. The process will form ammonium sulfide (AST) solution with up to about 55% concentration. Although knockout pots are used to reduce the amount of impurities such as liquid hydrocarbons that could carryover with the SWSG and/or acid gas into the absorption column 1, some hydrocarbons can carryover into the resulting ammonium sulfide product. Most of these organic impurities are insoluble and form a rag layer at the top of the resulting ammonium sulfide liquid that could be removed by decantation. However, there are typically some soluble hydrocarbons impurities as well as a small portion of the insoluble hydrocarbon impurities that do not decant, and therefore some organic impurities are always present with ammonium sulfide.

The prior art process of converting sour water stripper gas and acid gas to crude ammonium sulfide is depicted in a portion of FIG. 1. The sour water stripper gas or acid gas stream is introduced via line 15 into the ammonium sulfide absorption column 1, and is converted to ammonium sulfide (ASD) solution and is cooled, then directed to the ammonium sulfide storage unit 2.

As shown in FIG. 1, ammonium sulfide (ASD) solution from the acid gas or sour water stripper gas conversion is delivered from storage 2 to the AST reactor 3 and circulates through heat exchanger 21 and is cooled to about 10-20° C.

A heel of 40% ammonium sulfate solution prepared from commercial ammonium sulfate could be used at the start of the production. However, after first run some of the product could be retained in the reactor 3 as a heel, eliminating the need to add ammonium sulfate at the beginning of the process.

Sulfuric acid, either virgin or spent, is transported via line 36 to the reactor 3, enters the reactor 3 and mixes in the reactor with agitation and circulation. Excess sulfuric acid, about 2-5% excess of sulfuric acid by weight of ammonium sulfide, is used to ensure complete conversion of sulfide to sulfate. The sulfuric acid may be stored in the sulfuric acid storage unit 22. Virgin grade sulfuric acid or spent alkylation acid may be used in the process.

The ammonium sulfate reactor 3 is cooled with a cooling medium such as cooling water stream 24 to remove heat generated in the reaction between the acid and base and to increase the potential flow rate of raw materials added to the reactor 3. FIG. 1 illustrates a heat exchanger 21 surrounding a portion of the exterior of the reactor 3 for providing cooling.

A co-product of this process is hydrogen sulfide that could be recycled via lines 37 and/or 38 to the Claus SRU 6 for sulfur recovery, or to the caustic scrubber 7 to form sodium hydrosulfide, NaHS.

Unlike other SWS gas treatments, including sending the gas to a Claus SRU, the ammonia from the SWS gas is utilized with no destruction of the product.

The crude ammonium sulfate (AST) product is continuously removed from the bottom of reactor 3 through line 8 and sent to the storage 9.

The hydrocarbon impurities in ammonium sulfide, and in spent alkylation acid when used, accumulate in the reactor 3 and are sent back to the refinery when required through a pipeline 14 for reprocessing.

Figure 2:
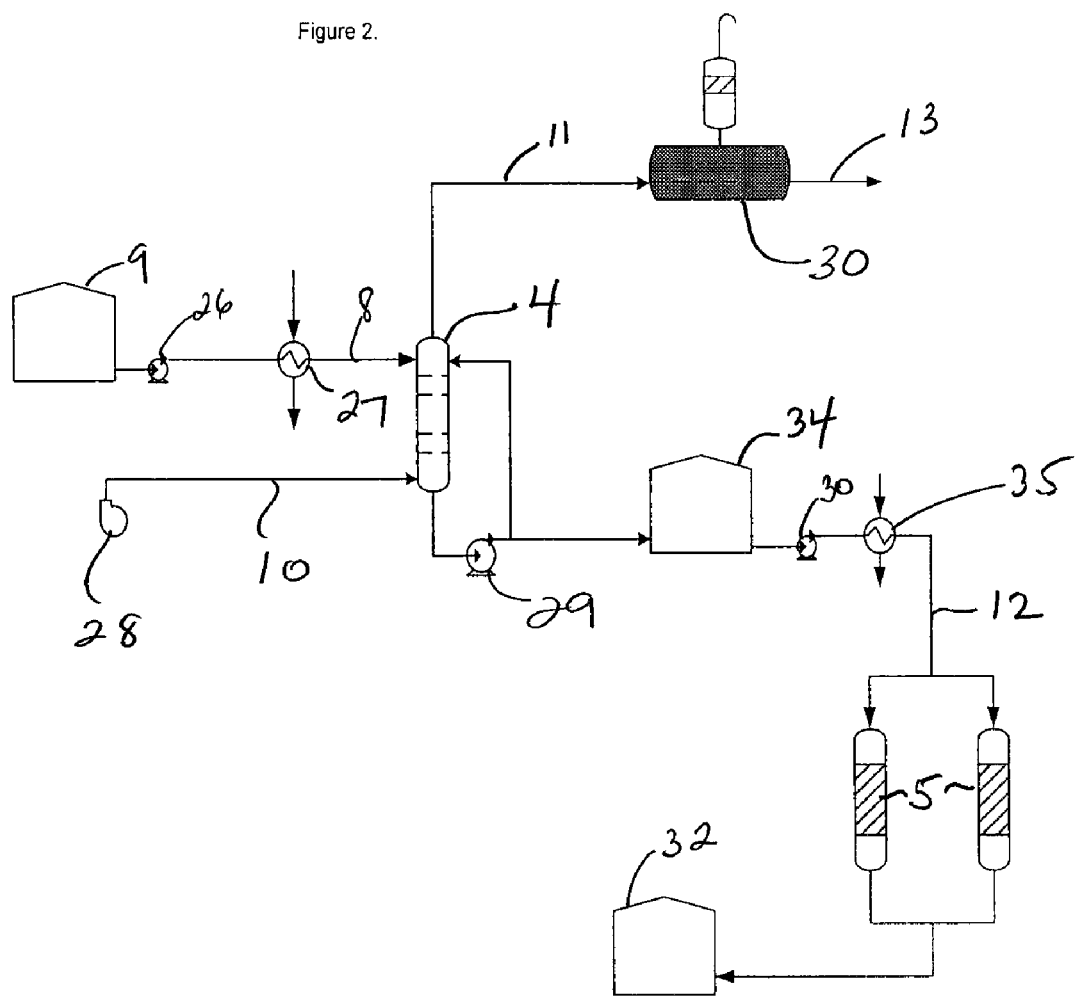
FIG. 2 is a graphical illustration for conversion of crude ammonium sulfate (AST) product to pure 40% solution.

As shown in FIG. 2, the crude AST then will be sent to the air stripping tower 4 from the top of the tower. The air stripping tower 4 incorporates a packed bed column, packed with liquid distributors or packing materials such as rasching rings and a heat exchanger to heat the ammonium sulfate up to 100-105° C.

Preferably air and/or nitrogen gas from a supply unit 28 travels through pipeline 10 and enters the bottom of air stripping tower 4 and travels through the column to contact the ammonium sulfate solution. Other inert gases or mixtures of inert gases may be used for air stripping.

The stripping gas exits tower 4 via line 11 and then is scrubbed with an organic solvent, such as diesel fuel, in a separate scrubber to entrain liberated hydrocarbons.

The liberated hydrocarbons are removed and disposed of, or more preferably are sent back to refinery through a pipeline 13 for processing. The liberated hydrocarbons include but are not limited to phenolic and cresylic acids, benzene, toluene and other hydrocarbons that are commonly found in refinery processing.

Ammonium sulfate is transported from the bottom of tower 4 to an ammonium sulfate storage unit 34.

The ammonium sulfate from the reaction of sulfuric acid and ammonium sulfide may be colored and may retain an organic hydrocarbon odor.

The air stripping removes the potential odor, but does not affect the color issues due to impurities.

If the ammonium sulfate product has discoloration due to hydrocarbon organic impurities it is transferred from ammonium sulfate storage unit 34 through pipeline 12 to the top of the activated charcoal absorption tower 5 containing a packed bed of activated charcoal and is heated to 90-100° C.

The now purified, colorless, odorless 40% ammonium sulfate solution is transferred from the bottom of absorption column 5 to the ammonium sulfate storage tank.

The 40% ammonium sulfate solution could be utilized as fertilizer as is or further concentrated to form crystals of ammonium sulfate. The saturation point for ammonium sulfate solution is about 42-45%.

Example 1

Treatment of Ammonium Sulfide with Virgin Sulfuric Acid

A 2 liter five neck round bottom flask equipped with mechanical agitator, condenser, thermometer, and two addition funnels for sulfuric acid and ammonium sulfide solution (ASD) was used. 100 grams of 40% commercial ammonium sulfate (AST) was added to the 2 liter flask as a starter solution heel. The top of the condenser exited directly to a caustic scrubber containing 962 grams of 20% caustic soda. The sulfuric acid addition funnel contained 596 grams of the 65% acid. The ammonium sulfide addition flask contained 520 ml of 45% ammonium sulfide solution. The mole ratio of virgin acid to ASD was 1.15 to 1.0. 180 grams of water was added to adjust the product AST concentration to 40%. ASD and virgin acid were dropped into the agitated ammonium sulfate solution. Temperature rose from 25° C. at the beginning of reaction to about 50° C. at the end of reaction. The crude ammonium sulfate product weight was 864.6 grams of colorless liquid with a distinct hydrocarbon odor, and was filtered to separate any heavy hydrocarbon impurities from ASD solution. The impurities were soluble in diesel fuel. Set forth in Table 1 are the results of two runs ("RUN-1" and "RUN-2") of this experiment.

Table 1 shows the calculated mass balance:

solution (ASD) was used. 100 grams of 40% ammonium sulfate (AST) solution was introduced to the flask prior to the introduction of the acid or ASD. The condenser exit was directed to a caustic scrubber containing 550 grams of 20% caustic soda. The spent sulfuric acid addition funnel contained 452 ml of 65% spent acid. The ammonium sulfide addition flask contained 472 ml of 49.6% ammonium sulfide solution. The mole ratio of spent acid to ASD was 1.15 to 1.0. 180 grams of water was added to adjust the product AST concentration to 40%. ASD and spent acid were dropped to the agitated ammonium sulfate solution. Temperature rose from 25° C. at the beginning of reaction to about 50° C. at the end of reaction. The crude ammonium sulfate product weight was 494 grams with brown color and distinct hydrocarbon odor which was separated by decantation from heavy hydrocarbon impurities. The impurities were soluble in diesel fuel.

Table 2 shows the calculated mass balance.

| For a full one liter batch | Amount (grams) | Moles | Experimental RUN |
|---|---|---|---|
| Heel, 40% commercial AST | 100 | 0.303 | 81.8 ml |
| 65% Spent sulfuric acid $H_2SO_4$ to be added | 596.3 | 3.952 | 340.5 ml |
| 49.60% ASD | 472 | 3.436 | 477.2 ml |
| Spent acid/ASD = 1:1.15 | | | |
| Caustic scrubber 20% NaOH | 550 | | |
| Reactor total mass | 1,168.3 | | |
| Expected mass loss due to $H_2S$ | 117.1 | | |

TABLE 1

Material balance for ammonium sulfate synthesis

| For a full liter batch: | Amount (grams) | Moles | Experimental RUN-1 (grams) | Experimental RUN-2 (grams) |
|---|---|---|---|---|
| Heel of 100 grams of 40% ($NH_2SO_4$ Solution | 100 | 0.303 | 100 | 100 |
| 65% $H_2SO_4$ to be added (454 g of 85.4% virgin $H_2SO_4$ + 142 g $H_2O$) | 596 | 3.95 | 596 | 596 |
| 45% ASD to be added | 520 | 3.434 | 520 | 520 |
| (Molar Ratio of 65% H2SO4: 45% ASD = 3.95:3.434 = 1.15:1.0) | | | | |
| Total mass added to reactor | 1216 | | 1216 | 1216 |
| Expected mass loss due to $H_2S$ evolution (calculated - 3.434 moles × 34 g/mole) | 116.8 | | 116.8 | 116.8 |
| Final mass in reactor (1216.0 g − 116.8 g = 1099.2 g) | (expected) 1099.2 | | (actual) 1058.7 (96.3%)* | (actual) 1062.13 (96.6%)* |
| AST originally in reactor (Heel) | 100 | 0.303 | | |
| Total AST in product batch (calculated = 3.434 moles × 132.14 g/mole + 40 g = 494 g) | 494 | | | |
| Add this much of $H_2O$ to adjust to 40% AST | 180 (expected) | | 180 (actual) | 180 (actual) |
| Total mass in reactor with H2O added (1099.2 g + 180 g = 1279.2 g) | 1279.2 | | 1238.7 | 1242.1 |
| AST percentage at the end of the reaction [494/(1099.2 + 180) × 100% = 38.6%], <40% | | | | |
| Experimental Data | | | | |
| Wt. of AST solution collected after separated from precipitate (residue) and filtered | | | 1016.3 | 1035.5 |
| Wt. of solid precipitate retained in the 5L round bottom flask after decanted the AST soln | | | 183.1 | 132.05 |

*= % conversion of ASD to AST

Example 2

Treatment of Ammonium Sulfide with Spent Alkylation Acid and a Heel or Initial Charge of AST

A 2 liter five neck round bottom flask equipped with mechanical agitator, condenser, thermometer, and two addition funnels for spent sulfuric acid and ammonium sulfide -continued

| For a full one liter batch | Amount (grams) | Moles | Experimental RUN |
|---|---|---|---|
| Mole ASD to AST = 3.436 = 454 g | | | |
| Final mass in reactor | 1051.20 | | |
| Water added to adjust for 40% AST | 180 | | |

-continued

| For a full one liter batch | Amount (grams) | Moles | Experimental RUN |
|---|---|---|---|
| Total mass in the reactor with water | 1231.20 | | |
| Total AST product batch | 494 | | |

The product from above reaction was subjected to air stripping.

Example 3

Treatment of Ammonium Sulfide with Sulfuric Acid with Cooling the Ammonium Sulfate Reactor The above reactions were repeated without the initial charge of 40% ammonium sulfate (AST) solution, but the ammonium sulfide (ASD) was placed in the reactor along with the required water amount to produce 40% ASD solution. The solution was cooled to about 5-15° C. and sulfuric acid was added at a rate that the exiting hydrogen sulfide gas was completely absorbed into the caustic scrubber with no breakthrough. The reaction/production time was cut from about 3 hrs to about 30 minutes.

Example 4

Air Stripping of Ammonium Sulfate Product from ASD and Virgin or Spent Sulfuric Acid Air stripping of crude ammonium sulfate product produced from either virgin or spent sulfuric acid was carried out with air or nitrogen.

Ammonium sulfate from ammonium sulfide and virgin or spent alkylation sulfuric acid was subjected to stripping to remove the hydrocarbon odor using air and/or nitrogen. 300 g of 40% aqueous $(NH_4)_2SO_4$ was placed in three-necked flask. The liquid recirculated from bottom to the top of column using a peristaltic pump. The column was filled with rasching rings. The flask and the column were heated to ~95° C. Gas (air or nitrogen) was introduced countercurrent to the liquid flow. The following discusses the results of stripping with air and of stripping with nitrogen gas, respectively.

The organic odor was removed from the AST solution under the following conditions by stripping with air.
 Air flow rate of about 700 ml/min.
 AST flow rate of about 200 ml/min.
 Temperature of about 95-100° C.
 Stripping time of about 5 hours
Lower flow rate of air and/or liquid increased the time to strip the odor impurities.

The organic odor was removed from the AST solution under the following conditions by stripping with nitrogen:
 Nitrogen flow of about 700 ml/min
 AST flow rate of about 200 ml/min
 Temperature range of 95-100° C.
 Stripping time of about 4.5 hours Example 5

De-colorization of Ammonium Sulfate Product

Stripping with air or nitrogen removed the hydrocarbon (organic) odor from the ammonium sulfate product whether it was prepared from either virgin sulfuric acid or the spent alkylation acid. When spent alkylation acid was used the final color of the ammonium sulfate solution was a brownish color that could not removed by air or nitrogen stripping. Removal of the undesirable color was achieved by either spray drying or with activated charcoal.

In the charcoal treatment process the colored AST product is introduced into a column containing a bed of activated charcoal heated to about 80-90° C. The colorless ammonium sulfate (AST) product is collected and stored as 40% solution or concentrated for crystallization.

Formation of Crystalline AST from Solution.

The formation of crystalline AST from AST solution can be accomplished by processes known to one of ordinary skill in the art. For example, excess water may be removed by evaporation, distillation-crystallization or spray drying. Spray drying is a preferred process, because it removes potential volatile organic impurities present from the refinery tail gas.

In the spray drying process used, the liquid ammonium sulfate solution was subjected to spray-drying in Fountain Mode or in Co-current Mode in a Niro Production Minor™ Spray Dryer with a feed rate of 10-15 Kg/hr and the outlet temperature of 70-130° C. using two-fluid pressure atomization at 200-325° C. to produce crystals of ammonium sulfate. The two different Spray Drying modes produced different particle sizes of white crystalline ammonium sulfate product.

What is claimed:

1. A process for converting ammonium sulfide to ammonium sulfate, comprising:
    (a) adding sulfuric acid to the ammonium sulfide, to produce crude ammonium sulfate product and hydrogen sulfide; and
    (b) contacting the crude ammonium sulfate product with a gas selected from the group consisting of air, nitrogen, and mixtures thereof, to remove hydrocarbon impurities from the ammonium sulfate product,
    to produce a concentrated and purified ammonium sulfate solution.

2. The process of claim 1, wherein step (a) further comprises adding sulfuric acid selected from the group consisting of virgin sulfuric acid, spent sulfuric acid and mixtures of virgin and spent sulfuric acid.

3. The process of claim 2, wherein step (a) further comprises adding an excess of the sulfuric acid by weight of the ammonium sulfide.

4. The process of claim 3, wherein step (a) further comprises adding about 2-5% excess of sulfuric acid by weight of the ammonium sulfide.

5. The process of claim 1, wherein:
    step (a) occurs in a reactor with agitation and circulation; and
    step (b) occurs in an air stripping tower having a top and a bottom, and the gas enters the bottom and travels through the tower to the top, contacting the crude ammonium sulfate product.

6. The process of claim 5, wherein step (b) further comprises transporting the gas exiting the top of the stripping tower to a scrubbing unit and scrubbing the gas with a solvent to remove hydrocarbons from the gas.

7. The process of claim 6, wherein the hydrocarbons removed from the gas are further processed.

8. The process of claim 7, wherein the hydrocarbons are further processed in a refinery.

9. The process of claim 1, wherein step (a) further comprises providing cooling.

10. The process of claim 9, wherein step (a) further comprises cooling to about 10-15° C.

11. The process of claim 1, further comprising subjecting the ammonium sulfate solution to treatment in an activated charcoal absorption tower to produce a colorless ammonium sulfate solution.

12. The process of claim 1, further comprising transporting the hydrogen sulfide produced in step (a) and recovering the hydrogen sulfide or subjecting it to a treatment selected from the group consisting of processing in a Claus SRU to recover elemental sulfur and scrubbing with caustic soda to produce sodium hydrogen sulfide.

13. The process of claim 1, wherein the ammonium sulfate solution is about a 40% solution.

14. The process of claim 1, further comprising the step of converting the ammonium sulfate solution into solid ammonium sulfate by removing water from the solution.

15. The process of claim 14, further comprising the step of converting the ammonium sulfate solution into solid ammonium sulfate via evaporation, distillation-crystallization or spray drying.

16. The process of claim 15, further comprising the step of converting the ammonium sulfate solution into solid ammonium sulfate via spray drying.

17. A process for converting sour water stripper gas, acid gas, coke oven gas and spent alkylation sulfuric acid to agriculturally beneficial liquid or crystalline ammonium sulfate, comprising the following steps:
  (a) converting the sour water stripper gas, acid gas or coke oven gas to ammonium sulfide; and
  (b) reacting the ammonium sulfide with sulfuric acid to produce ammonium sulfate while cooling in a reactor at about 10-20° C. during addition of the sulfuric acid to slow reaction kinetics but accelerate continuous conversion of ammonium sulfide to ammonium sulfate.

18. A process for converting ammonium sulfide to ammonium sulfate, comprising:
  (a) adding sulfuric acid to the ammonium sulfide, to produce crude ammonium sulfate product and hydrogen sulfide; and
  (b) contacting the crude ammonium sulfate product with a gas selected from the group consisting of air, nitrogen, inert gases and mixtures thereof, to remove hydrocarbon impurities from the ammonium sulfate product,
  to produce a concentrated and purified ammonium sulfate solution.

* * * * *

UNITED STATES PATENT AND TRADEMARK OFFICE
CERTIFICATE OF CORRECTION

PATENT NO. : 7,897,133 B1  
APPLICATION NO. : 12/563034  
DATED : March 1, 2011  
INVENTOR(S) : Michael Massoud Hojjatie, Anatoly Pustilnik and Harry Charles Kominski It is certified that error appears in the above-identified patent and that said Letters Patent is hereby corrected as shown below:

In the Specification

Column 2, line 46, the text "produced" should be changed to -- produce --.

Column 3, line 37, the text "Phoenix Ariz." should be changed to -- Phoenix, Arizona, --.

Column 4, line 41, the text "according" should be changed to -- according to --.

Column 5, line 32, the text "Phoenix, Ariz." should be changed to -- Phoenix, Arizona. --.

Columns 7 and 8, line 36 in Table 1, the text "Heel of 100 grams of 40% ($NH_2SO_4$ Solution" should be changed to -- Heel of 100 grams of 40% $(NH_4)_2SO_4$ Solution --.

Column 9, line 37, the text "placed in" should be changed to -- placed in a --.

Signed and Sealed this  
Eighth Day of October, 2013

Teresa Stanek Rea  
*Deputy Director of the United States Patent and Trademark Office*